United States Patent
Higashikado et al.

(10) Patent No.: US 7,832,010 B2
(45) Date of Patent: Nov. 9, 2010

(54) UNAUTHORIZED ACCESS PROGRAM MONITORING METHOD, UNAUTHORIZED ACCESS PROGRAM DETECTING APPARATUS, AND UNAUTHORIZED ACCESS PROGRAM CONTROL APPARATUS

(75) Inventors: Yoshiki Higashikado, Kawasaki (JP); Satoru Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 740 days.

(21) Appl. No.: 11/785,558

(22) Filed: Apr. 18, 2007

(65) Prior Publication Data

US 2007/0256119 A1     Nov. 1, 2007

(51) Int. Cl.
*G06F 11/00* (2006.01)
*G06F 17/30* (2006.01)

(52) U.S. Cl. .................... 726/22; 726/23; 726/26

(58) Field of Classification Search ............... 726/2–4, 726/11, 22–27; 713/150, 188, 193–194, 713/189
See application file for complete search history.

(56) References Cited

U.S. PATENT DOCUMENTS

| | | | | |
|---|---|---|---|---|
| 6,952,779 | B1 * | 10/2005 | Cohen et al. ............ | 726/22 |
| 2003/0159064 | A1 | 8/2003 | Takahashi | |

FOREIGN PATENT DOCUMENTS

| | | |
|---|---|---|
| JP | 2003-241989 | 8/2003 |
| JP | 2004-164270 | 6/2004 |
| JP | 2004-259060 | 9/2004 |
| JP | 2004-260575 | 9/2004 |

OTHER PUBLICATIONS http://www.checkpoint.com/products/interspect/index.html (Jan. 1, 2004).
"Integrated Network Management under multivendor environment and decenterlization", Nikkei Communication, No. 229, Nikkei BP pp. 118-119 (Sep. 2, 1996).
Fumihiko Sano et al. "Simulation Self-Reproduction Mechanisim of the Network Worm", vol. 95, No. 240 (ISEC95-15), pp. 1-11 (Sep. 20, 1995).
International Search Report of the International Published Application No. PCT/JP2004/015406 (mailed Dec. 14, 2006).
English International Preliminary Report, dated May 3, 2007 for the international application PCT/JP2004/015406 (PCT Rule 44bis).
Notice of Reasons for Refusal issued Jul. 6, 2010 in the Japanese Patent Application 2006-512129 based on the original international application PCT/2004/015406.

* cited by examiner

*Primary Examiner*—Hosuk Song
(74) *Attorney, Agent, or Firm*—Staas & Halsey LLP (57) ABSTRACT

The apparatus analyzes management information about network information collected from a computer and a router, detects a change in the management information specific to the activity of an unauthorized access program (worm), and generates alert information including a type of apparatus whose collected management information indicates the detected change and address information about an apparatus suspected of performing the activity of a worm. When the type of apparatus in the alert information refers to a computer, the apparatus generates an instruction to delete relayed information for the computer. When the type of apparatus refers to a network connection apparatus, the apparatus generates an instruction to set a filter for cutting off the communications of a worm with the network connection apparatus. Thus, the apparatus transmits the instructions.

15 Claims, 9 Drawing Sheets

UNAUTHORIZED ACCESS PROGRAM MONITORING METHOD, UNAUTHORIZED ACCESS PROGRAM DETECTING APPARATUS, AND UNAUTHORIZED ACCESS PROGRAM CONTROL APPARATUS

CROSS REFERENCE TO RELATED APPLICATIONS

The present application claims the benefit of PCT International application number PCT/JP2004/015406 filed on Oct. 19, 2004, the subject matter of which is hereby incorporated herein by reference.

BACKGROUND OF THE INVENTION

1. Field of the Invention

The present invention relates to a technique of detecting and isolating viruses and worms infecting a server and a PC connected to a network at an early stage using a network management technique of an existing network management technique, for example, a simple network management protocol (SNMP) so as to prevent damage by viruses and worms.

The present invention can detect and control an unauthorized access program without implementing special software for each network and computer in a network system in which network management is implemented.

2. Description of the Related Art

Figure 9:
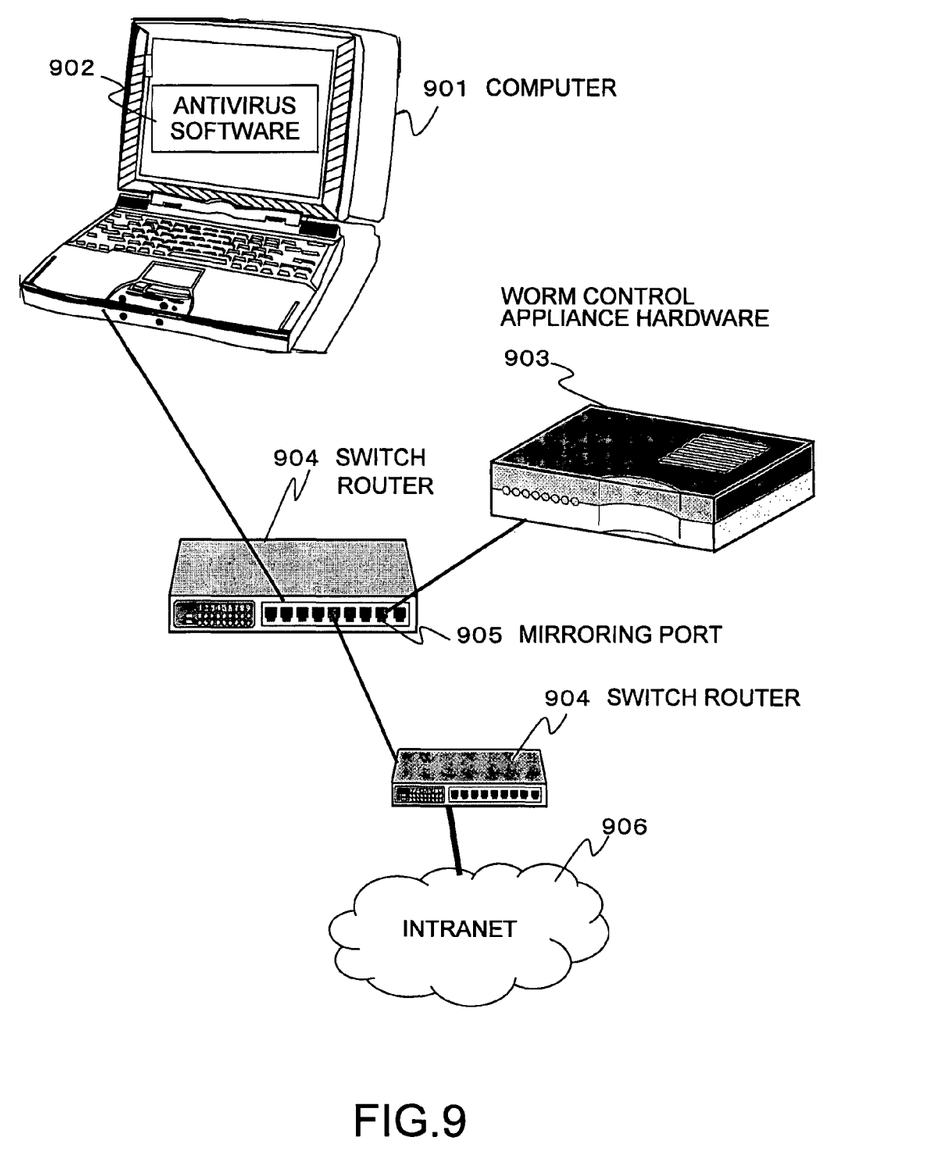
FIG. 9 shows an example of the worm detection and isolation system.

Recently, in the Internet and intranets, there is a problem of the damage by a program, such as a worm, virus, which accesses unauthorized sites. FIG. 9 shows an example of an unauthorized access program detection and isolation system. Conventionally, an unauthorized access program detecting and isolating system uses a method of implementing an antivirus software 902 on each computer 901 of an end point to detect infection or monitoring network traffic using an unauthorized access program control (worm control) appliance hardware 903 provided in a network (for example, "Check Point InterSpect Catalog" in January, 2004 by Check Point Software Technologies Inc.)

Since the antivirus software 902 is a signature-based program operating a detecting process on the basis of matching the specific binary pattern of an unauthorized access program, it is effective in detecting known worms.

However, since variations or new types of an unauthorized access programs have different binary patterns, the detecting process hardly works. Then, it is necessary for the antivirus software 902 to quickly update the latest binary pattern for detecting an unauthorized access program from a vendor of the antivirus software 902.

There is another problem regarding some pieces of antivirus software 902 provided with facilities of preventing infection by detecting an unknown unauthorized access program. Since they sometimes cause erroneous detection, there few unauthorized access programs can be correctly detected.

On the other hand, the worm control appliance hardware 903 provided for a network is dedicated for collecting and analyzing all packets transmitted over the network and detects the communications not in accordance with protocol rules, the traffic exploiting the fragility and so on, thereby detecting the activities of unauthorized access programs on the network.

The worm control appliance hardware 903 can detect the activity of a variation or a new type of unauthorized access program. However, in order to capture the traffic of unauthorized access, it is necessary to monitor all traffic of an intranet 906 (network) from a mirroring port 905 of a switch router 904 in each network segment, and to determine whether or not it is unauthorized traffic. Therefore, the processes of software and hardware become heavy burden, and cannot be sufficiently performed when the network traffic increases.

Furthermore, since dedicated hardware is required in each segment of a network, a large network requires plural monitor systems (worm control appliance hardware 903). Accordingly, the number of systems to be managed increases and the number of managing steps explodes.

SUMMARY OF THE INVENTION

The present invention realizes an apparatus that can detect the activity of an unauthorized access program without conventional signature-based antivirus software on each computer or appliance hardware for each network segment.

The present invention also realizes an apparatus that can isolate the detected unauthorized access program so that the unauthorized access program cannot grow its infecting activity.

The present invention realizes an apparatus that can monitor the activity of an unauthorized access program in a network, and includes: a management information monitoring unit for analyzing management information about network information collected from a computer or a network connection apparatus, and detecting a change of the management information about the network information specific to the activity of the unauthorized access program; and an alert generating unit for generating alert information including a type of an apparatus whose management information about network information relating to the detection of the change is collected and address information about an apparatus suspected of performing activities of the unauthorized access program.

In many cases, network equipment which is connected with a network and mounted in a computer performs information communications over a network has network information management facilities. The present invention uses the management information about the network information provided by a network information managing unit used as a network information management facility, can analyze a change of the management information about the network information specific to the activity of an unauthorized access program, that is, a change of specific management information made in an unauthorized information transmitting/receiving process, detect a sign of the activity of an unauthorized access program from a predetermined change, and generate an alert.

Therefore, in the network system which implements network information management, the activity of an unauthorized access program can be detected without setting appliance hardware for controlling an unauthorized access program for each network or implementing special software for each computer.

In addition, the present invention further includes a management information collecting unit for collecting in real time the management information about the network information from the computer or the network connection apparatus when the above-mentioned units can be performed.

The present invention can detect the activity of an unauthorized access program using not only the management information about collected and stored static network information, but also the management information about the network information collected in real time.

Furthermore, in the management information monitoring unit, the present invention can extract the error notification information due to an uncertain destination from the management information collected from the network connection apparatus, and detect the state of a predetermined uptrend of the amount of the error notification information during transmission as the change.

Otherwise, the error notification information due to an uncertain destination may be extracted from the management information about the network information collected from the computer, and the state of a predetermined uptrend of the amount of the error notification information during transmission may be detected as the change.

Otherwise, the amount of information discarded due to an uncertain destination may be extracted from the management information collected from the network connection apparatus, and the state of a predetermined uptrend of the amount of discarded information may be detected as the change.

Otherwise, the management information collected from the computer may be analyzed, and one of the values of the number of end points for which a connection is being established in the computer and the number of end points for which a connection fails to be established whichever indicates the state of a predetermined uptrend may be detected as the change.

As described above, the continuous uptrend of the amount of information about the error notification information due to an uncertain destination, from a computer or a network connection apparatus, the amount of discarded information due to an uncertain destination, the number of end points for which a connection is being established in the computer, the number of end points for which a connection fails to be established, etc. indicates an increase of unauthorized traffic. Therefore, the uptrend is used in detecting the activity of an unauthorized access program.

Furthermore, the present invention includes an alert analyzing unit for of analyzing from the alert information the type of an apparatus from which the management information about the network information relating to the detection of the change, and the address information about the computer or the network connection apparatus suspected of performing the activity of the unauthorized access program; a control instruction generating unit for generating an instruction to delete relayed information for a computer designated by the address information when the type of the apparatus is a computer, and generating an instruction to set a filter that cuts off the communication of the unauthorized access program to the network connection apparatus designated by the address information when the type of the apparatus is a network connection apparatus; and a control directing step of transmitting an instruction to delete the relayed information or an instruction to set the filter.

By instructing the network information managing unit of the computer to delete the relayed information to another network segment, or by instructing the network information managing unit of the network connection apparatus to set the filter information for cutting off the communications to other network segments, the unauthorized access of an unauthorized access program performing activities in a network segment to external devices can be stopped, thereby insulating the unauthorized access program and preventing the growth of infection.

Furthermore, the present invention also includes a network configuration managing unit for managing the network configuration information showing the configuration of a network. The control instruction generating unit analyzes the address information about the computer, the network segment, or the network connection apparatus which controls the network segment, that is suspected of performing the activity of the unauthorized access program, by referring to the network configuration information.

One unauthorized access program monitor apparatus can designates, in a large network, a computer and network segment (sub-network) in which an unauthorized access program is performing unauthorized communications, and thereby cab prevent the growth of infection of the unauthorized access program over the large network.

Furthermore, the present invention can be provided with the above-mentioned processing means, component, etc. as a program used to direct a computer to function as an apparatus for detecting an unauthorized access program, and a program used to direct a computer to function as an apparatus for isolating an unauthorized access program.

According to the present invention, an unauthorized access program can be detected using the network management information about a computer or a network connection apparatus without implementing special software in a network and each system in a network system which implements a network managing process.

Furthermore, according to the present invention, by transmitting an instruction for the network setting information about a computer or filtering facility setting information about a network connection apparatus, a detected unauthorized access program can be isolated.

Additionally, according to the present invention, one monitor system can detect, in a large network, the unauthorized communications of an unauthorized access program in a network segment or a computer, and isolate the detected program, thereby preventing the growth of the infection of the unauthorized access program in the large network.

DETAILED DESCRIPTION OF THE PREFERRED EMBODIMENTS

Figure 1:
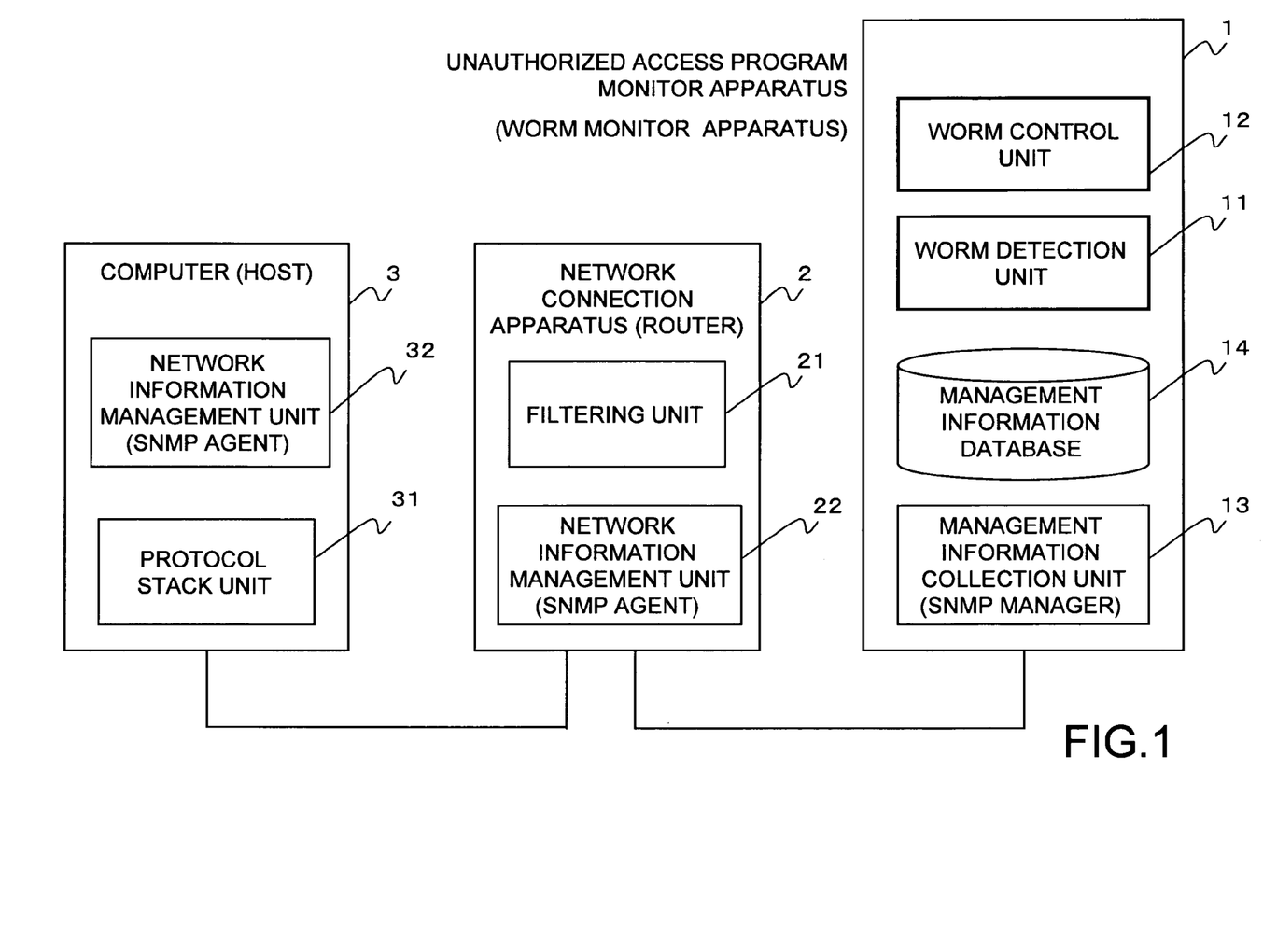
FIG. 1 shows the configuration of the system according to a mode for embodying the present invention.

FIG. 1 shows the configuration of the system according to a mode for embodying the present invention.

An unauthorized access program monitor apparatus (worm monitor apparatus) 1 detects and isolates a program (hereinafter referred to simply as a "worm") such as a virus, a worm, etc. using the management information about network information collected from a network connection apparatus (router) 2 and a computer (host) 3.

The worm monitor apparatus 1 includes a worm detection unit 11 for detecting the activities of worms in a network, a worm control unit 12 for performing predetermined control over the detected activities of worms, a management information collection unit (SNMP manager) 13 for collecting the management information about each piece of network information from the network connection apparatus 2 or the computer 3, and a management information database 14 for accumulating the collected management information about the network information.

The network connection apparatus 2 controls a connection between network segments, and can be, for example, a router, a switch, and so on. The network connection apparatus 2 includes a filtering unit 21 for passing or cutting off the network information on a predetermined condition, and a network information management unit 22 for managing the network information about itself and transmitting the management information about the network information at a request to the management information collection unit 13 of the worm monitor apparatus 1.

The computer 3 has a network information management facility. The computer 3 includes a protocol stack unit 31 for hierarchically processing a network protocol, and a network information management unit 32 for managing the network information about itself and transmitting the management information about the network information at a request to the management information collection unit 13 of the worm monitor apparatus 1.

Figure 2:
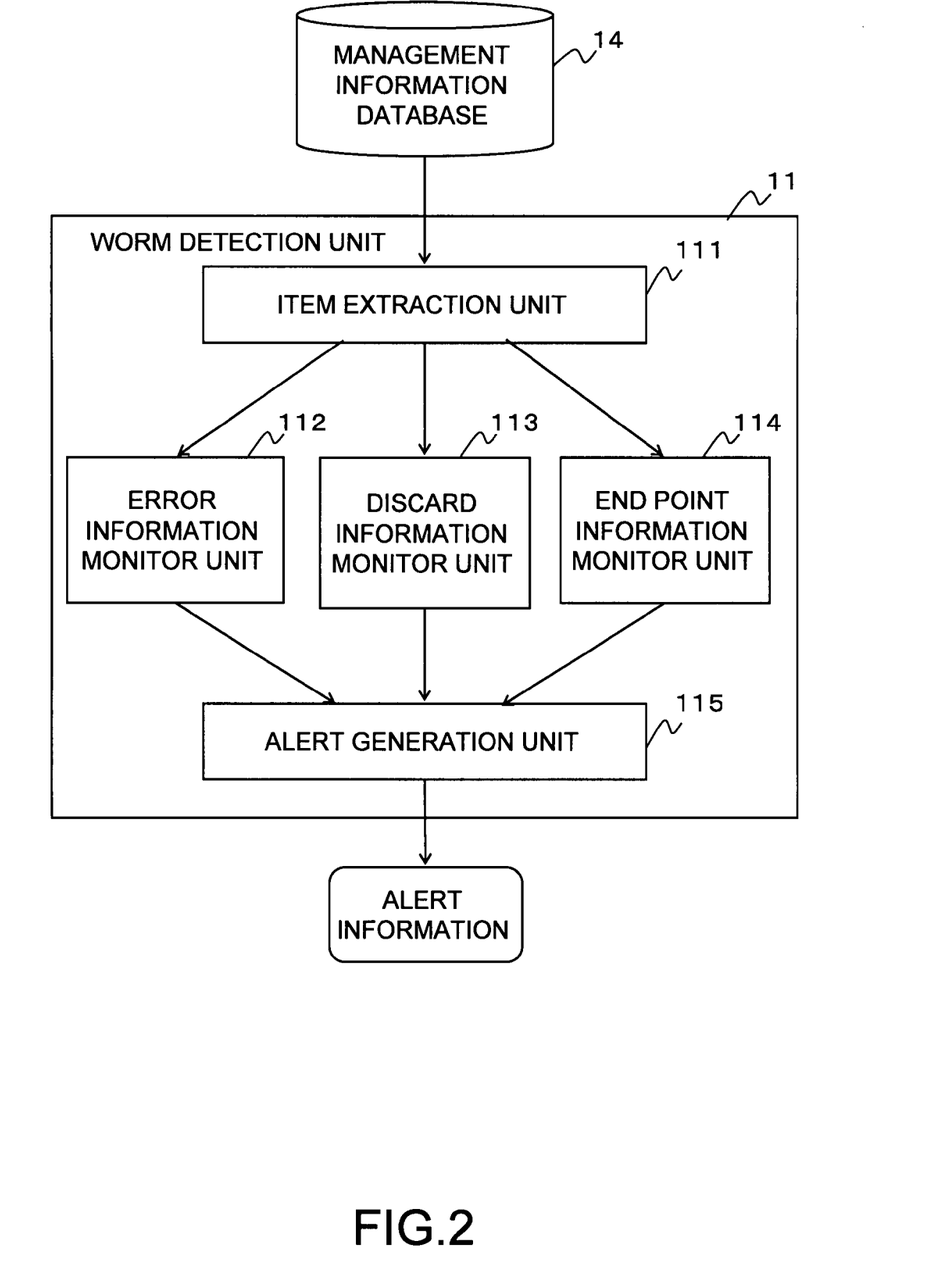
FIG. 2 shows an example of a block configuration of the worm detection unit.

FIG. 2 shows an example of the block configuration of the worm detection unit 11 of the worm monitor apparatus 1.

The worm detection unit 11 includes an item extraction unit 111, an error information monitor unit 112, a discard information monitor unit 113, an end point information monitor unit 114, and an alert generation unit 115.

The item extraction unit 111 is processing means for extracting error notification information due to an uncertain destination in a network, an amount of discarded information due to an uncertain destination, and end point information of the computer 3 as necessary items for detection of a worm from the management information about the network information accumulated in the management information database 14, and passing the extracted information to each information monitor unit, that is, the error information monitor unit 112, the discard information monitor unit 113, and the end point information monitor unit 114.

The error information monitor unit 112 is processing means for analyzing the error notification information about the management information about network information as to whether or not the number of error notifications is continuously increasing, and detecting a change to a "increase state" when the number is increasing in excess of a predetermined threshold. The error information monitor unit 112 counts the number of uncertain destination error notifications according to the management information about the network information about the network connection apparatus 2 or the computer 3, determines whether the error notification refers to a receiving side or a transmitting side, and notifies the alert generation unit 115 that the number of error notifications has exceeded the predetermined threshold.

The discard information monitor unit 113 is processing means for counting the amount of discarded information from the discard information about the management information about the network information, analyzing whether or not the amount of discarded information is continuously increasing, and detecting a change to a "increase state" when the analysis result indicates an increase in excess of the predetermined threshold. The discard information monitor unit 113 analyzes the amount of information discarded after an unsuccessful exchange due to an uncertain destination when each network connection apparatus 2 exchanged the information, and notifies the alert generation unit 115 when the amount of discarded information has exceeded the predetermined threshold.

The end point information monitor unit 114 is processing means for counting the number of end points being connected according to the end point information about the management information about the network information, analyzing whether or not the number of end points being connected is continuously increasing, and detecting a change to a "increase state" when the number indicates an increase in excess of the predetermined threshold. The end point information monitor unit 114 counts the number of end points in the connecting state for an uncertain destination when each computer 3 starts a connection, and notifies the alert generation unit 115 when the number of end points being connected increases and exceeds the predetermined threshold.

The alert generation unit 115 is processing means for generating alert information indicating that a worm is operating in a network when the unit receives a notification of a change to a "increase state" of information to be monitored from any means of the error information monitor unit 112, the discard information monitor unit 113, and the end point information monitor unit 114. The alert information includes a type of an apparatus indicating either "a computer" or "a network connection apparatus" which generated the management information about the network information that is a cause of the change, the address information of the apparatus which generates the management information, etc.

Figure 3:
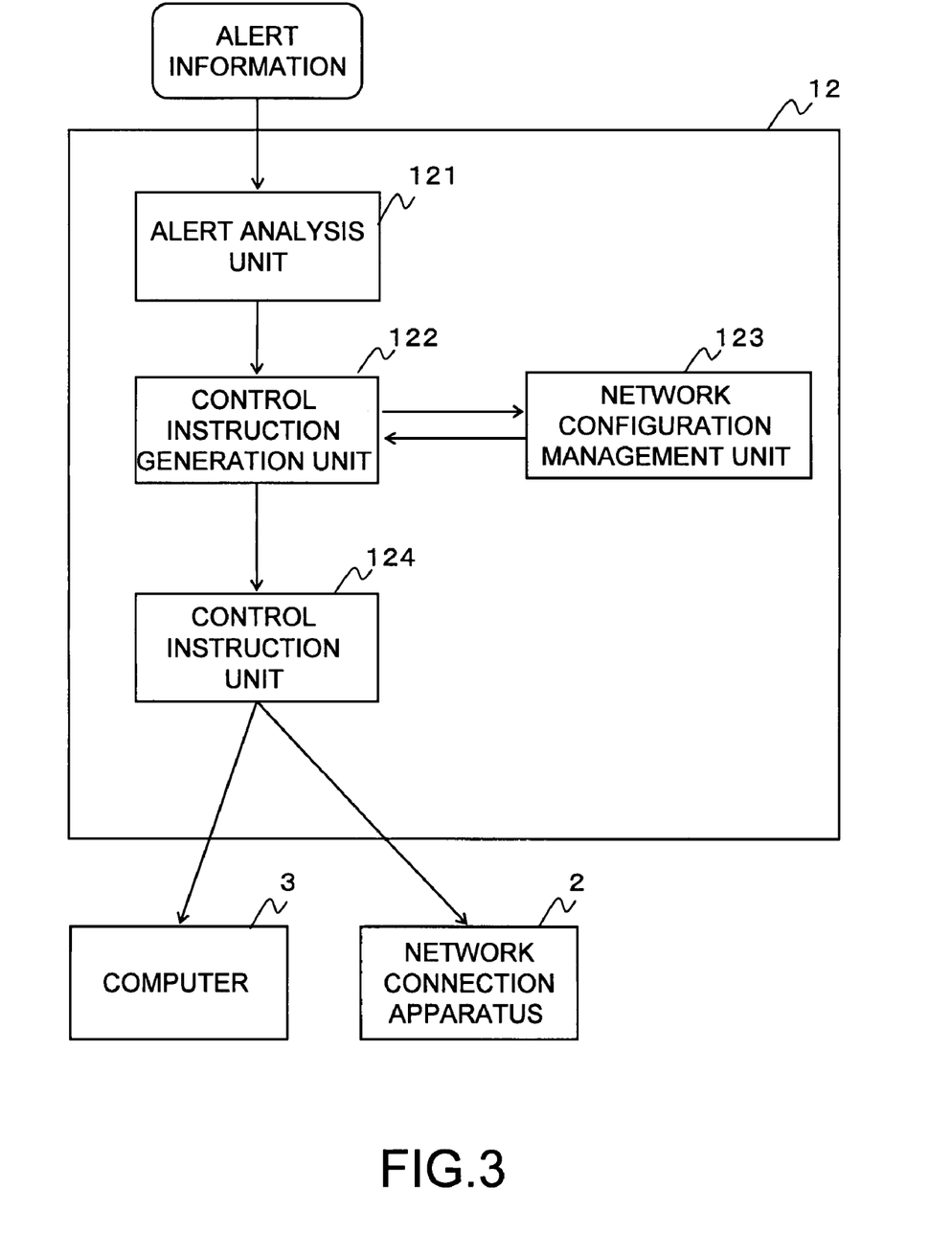
FIG. 3 shows an example of a block configuration of the worm control unit.

FIG. 3 shows an example of the block configuration of the worm control unit 12.

The worm control unit 12 includes an alert analysis unit 121, a control instruction generation unit 122, a network configuration management unit 123, and a control instruction unit 124.

The alert analysis unit 121 is processing means for analyzing the type of an apparatus from which the management information about the network information is collected and the address information about the apparatus from the input alert information. The alert analysis unit 121 passes the analyzed type of the apparatus and the address information to the control instruction generation unit 122.

The control instruction generation unit 122 is processing means for generating a control instruction for the activity of a worm on the basis of the analysis result on the alert information. When the type of apparatus as an analysis result passed from the alert analysis unit 121 is a "computer", the control instruction generation unit 122 generates an instruction to delete the relayed information for the computer 3 designated on the basis of the address information about the alert information. When the type of apparatus is a "network connection apparatus", the control instruction generation unit 122 generates an instruction to set a filter for cutting off the communications of the unauthorized access program to the network connection apparatus 2 designated on the basis of the address information about the alert information, and passes an instruction to delete the generated relayed information or an instruction to set a filter to the control instruction unit 124.

The control instruction generation unit 122 performs the above-mentioned processes in cooperation with the network configuration management unit 123. The network configuration management unit 123 is processing means for managing the configuration of the network to be monitored by the worm monitor apparatus 1.

The management information collection unit 13 is processing means for collecting the management information about the network information from the network connection apparatus 2 or the computer 3, and accumulating the information in the management information database 14.

In the network with the configuration shown in FIG. 1, the management information collection unit 13 of the worm monitor apparatus collects the management information about the network information from each network connection apparatus 2 and computer 3 at predetermined intervals, and accumulates the information in the management information database 14.

Figure 4:
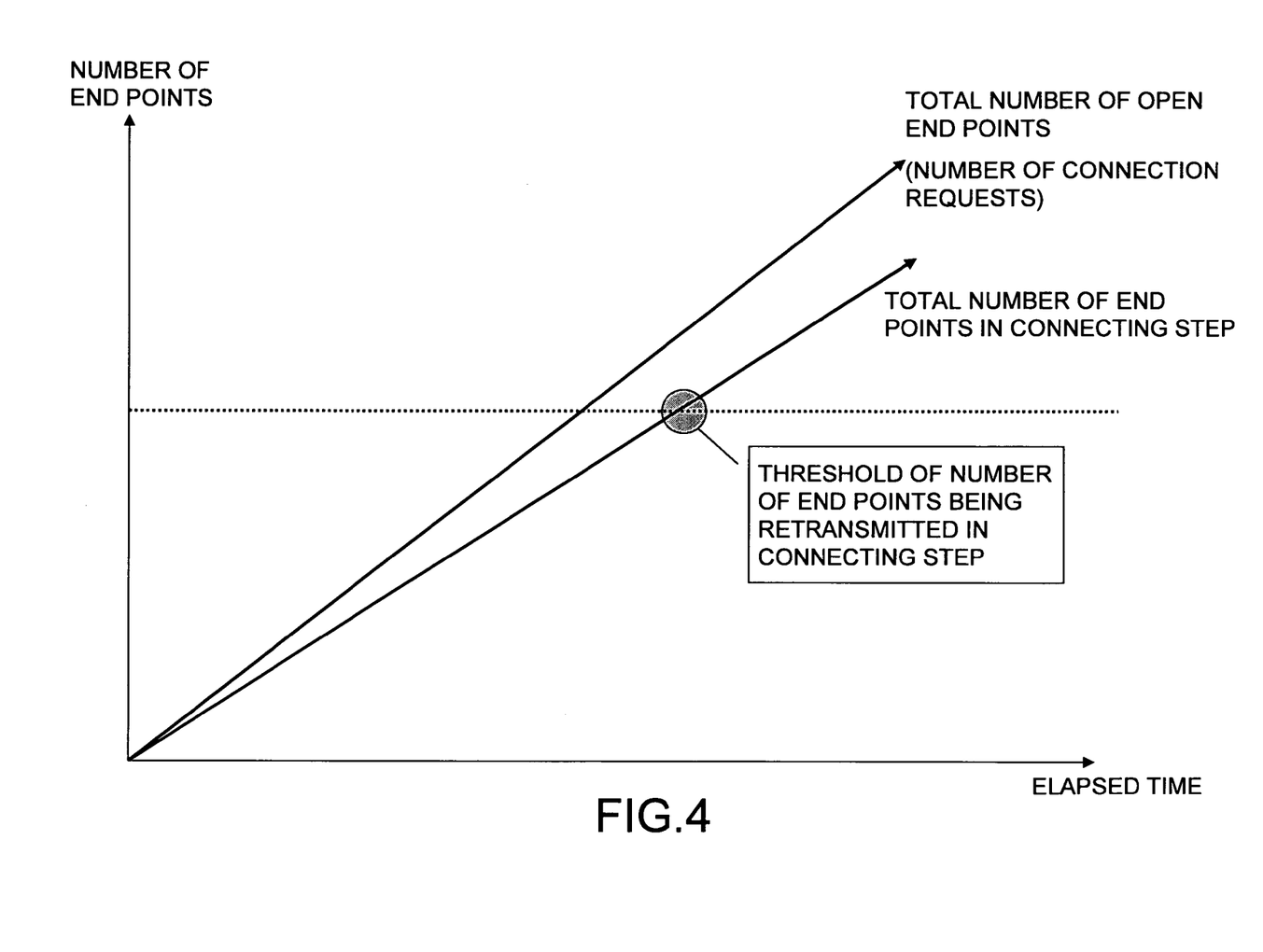
FIG. 4 shows an example of a variation of network management information relating to the establishment of a connection of a computer.

Assume that a worm performs its activity in the computer 3. The worm tries to create connections to the addresses in a wide range to efficiently develop the activity. Therefore, a large number of connection request packets are transmitted from the computer 3 without specifying destinations. Therefore, there increases the number of notifications (number of reception) of error information indicating uncertain destinations. In the case that the worm uses connection-oriented communications, the number of total open end points of the computer 3 will increase after rising the number of connection requests by the activity of the worm as shown in FIG. 4. The total number of end points in the connecting step (during connection) until the retransmission time-out state entered increases because there are no actual destinations to be connected with in these connection requests.

Therefore, the worm detection unit 11 of the worm monitor apparatus 1 extracts through the item extraction unit 111 the number of end points in the connecting step in the computer 3, or the number of notifications of error information indicating an uncertain destination according to the management information about the network information collected from the network information management unit 32 of the computer 3. Then, the error information monitor unit 112 analyzes the amount of notification of the error information about an uncertain connection destination, and the end point information monitor unit 114 analyzes the number of end points being connected. When the worm detection unit 11 determines that the information exceeds a predetermined threshold, it recognizes that the worm is performing its activity. The alert generation unit 115 generates the alert information including the type of apparatus to be detected (here, a "computer" is set as the type of apparatus), and address information about the computer 3 in which the worm is performing its activity, that is, which is infected with the worm, and passes the alert information to the worm control unit 12.

The worm control unit 12 receives the alert information from the alert generation unit 115 through the alert analysis unit 121. Upon receipt of the notification of the alert information that the apparatus infected with the worm is the computer 3, the worm control unit 12 generates through the control instruction generation unit 122 an instruction to delete the relayed information about the protocol stack unit 31 to the network information management unit 32 of the computer 3.

Thus, in the process of the protocol stack unit 31, the communication of the computer 3 is cut off to a destination other than the network segments of the computer 3, thereby successfully preventing the worm from infecting other network segments.

Figure 5:
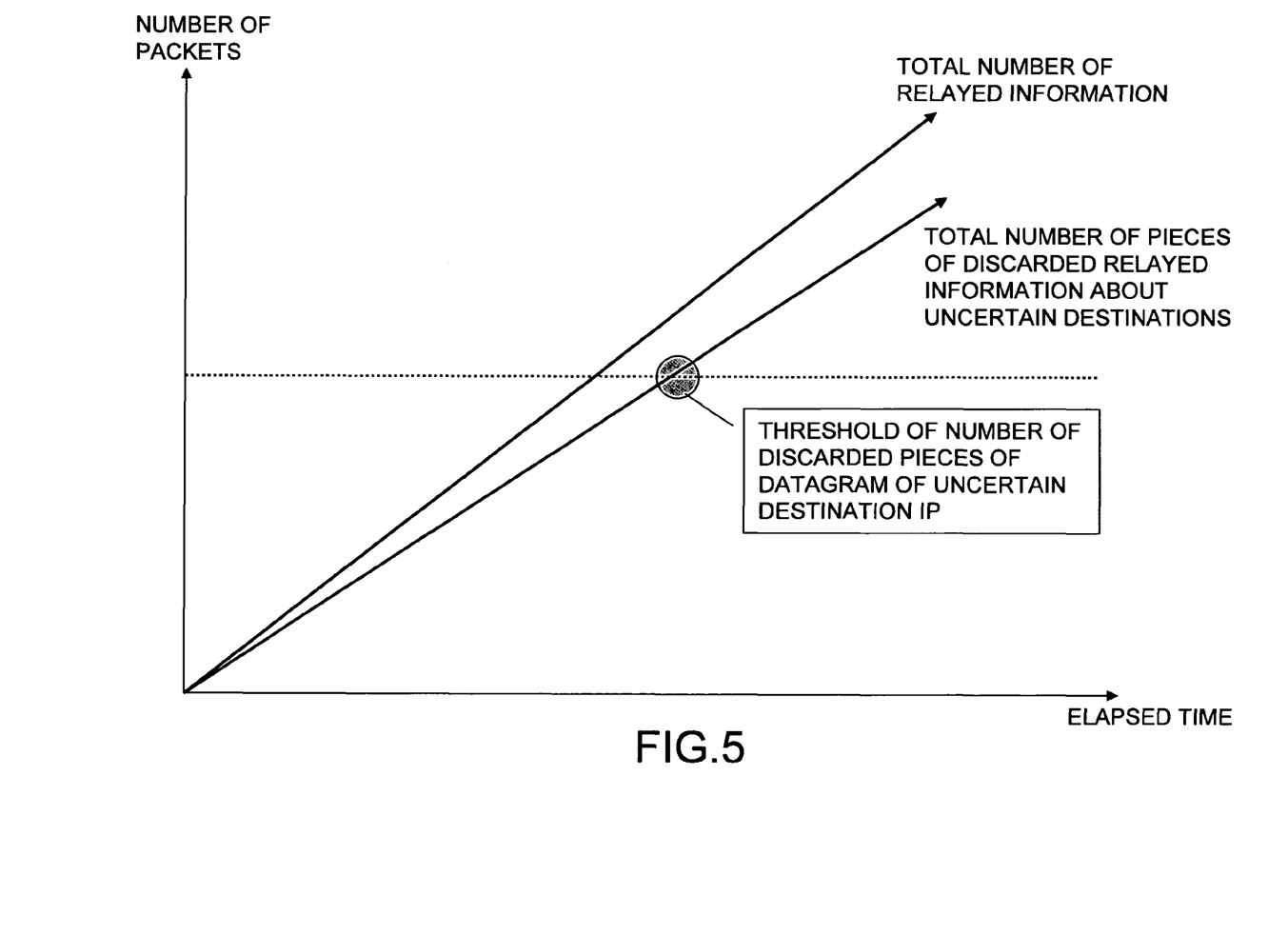
FIG. 5 shows an example of a variation of the amount of discarded relayed information in network equipment.

By transmitting a connection request having destination addresses in a wide range from the computer 3 infected with the worm, the network connection apparatus 2 receives a large number of connection requests having no actual destinations. Therefore, there increases the number of notifications (number of transmissions) of error information indicating uncertain destinations to be connected in the network connection apparatus 2. In addition, as shown in FIG. 5, there increases the number of pieces of relayed information in the entire network connection apparatus 2 with increasing the number of pieces of relayed information by the activity of the worm. The total number of pieces of discard information about the relayed information increases by uncertain destinations due to the absence of actual destinations to be connected.

Therefore, the worm detection unit 11 of the worm monitor apparatus 1 extracts through the item extraction unit 111 the number of pieces of discard information about the relayed information by uncertain destinations or the number of notifications of the error information indicating uncertain destinations from the management information about the network information collected from the network information management unit 22 of the network connection apparatus 2. Then, it analyzes through the error information monitor unit 112 the amount of notification of the error information about uncertain destinations to be connected, analyzes through the discard information monitor unit 113 the amount of discarded information about the relayed information. When the worm detection unit 11 determines that the above-mentioned information exceeds a predetermined threshold, it detects that the worm is performing its activity in the network segments under the network connection apparatus 2. Then, the alert generation unit 115 generates alert information including the type of apparatus to be detected (here, a network connection apparatus" is set as the type of apparatus), the address information about the network connection apparatus 2, and the address information about the network segments under the network connection apparatus 2 in which the worm is performing its activity, that is, which is infected with the worm, and passes the alert information to the worm control unit 12.

The worm control unit 12 receives the alert information from the alert generation unit 115 through the alert analysis unit 121. Upon receipt of the notification in the alert information that the apparatus which controls the network segment and is infected with a worm is the network connection apparatus 2, the control instruction generation unit 122 transmits an instruction to set a filter for cutting off the traffic generated by the activity of the worm to the filtering unit 21 of the network connection apparatus 2, and changes the setting of the filter facility of the network connection apparatus 2.

Thus, the communication from the network segments controlled by the network connection apparatus 2 to other network segments are cut off in the network connection apparatus 2, thereby preventing the worm from further infecting other network segments.

Figure 6:
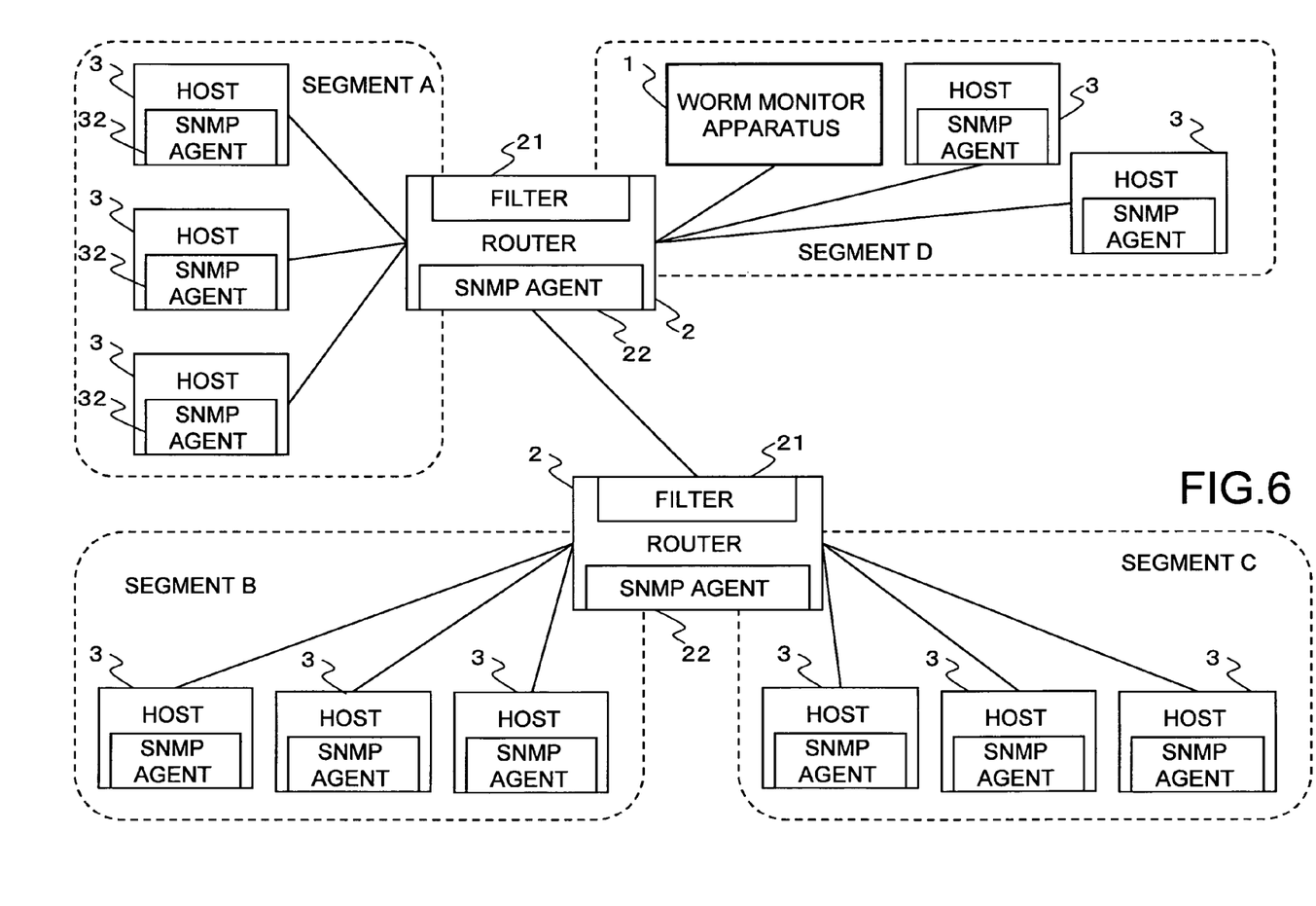
FIG. 6 shows an example of the configuration in an embodiment of the present invention.

FIG. 6 shows an embodiment of the present invention. It is assumed that the worm monitor apparatus 1 monitors the activity of the worm in plural network segments A to D, and sets one worm monitor apparatus 1 in the segment D. Assume that the network connection apparatus 2 is a router, and the network connection apparatus 2 is a host PC. Also assume that an SNMP agent corresponding to a simple network managing protocol (SNMP) is implemented as the network information management unit 22 of the network connection apparatus (router) 2 and the network information management unit 32 of the computer (host) 3, and the management information about the network information is managed as management information base (MIB) information. Also assume that the SNMP and TCP/IP are used as protocols of a network.

The management information collection unit 13 of the worm monitor apparatus 1 issues an inquiry to each host 3 and router 2 in the network at predetermined intervals, and collects and accumulates the MIB information in the management information database 14, or when an abnormal condition is detected, the management information (MIB information) about the network information is transmitted from the SNMP agents 22 and 32 of each router 2 or host 3 to the management information collection unit 13 through a trap.

In the worm monitor apparatus 1, the MIB information collected by the management information collection unit 13 is transmitted to the worm detection unit 11. The worm detection unit 11 performs a worm detecting process on each router 2 and host 3, and checks a sign of the activity of a worm. When a sign of the activity of the worm is detected, it passes the address of the corresponding router 2 or host 3 to the worm control unit 12.

Figure 7:
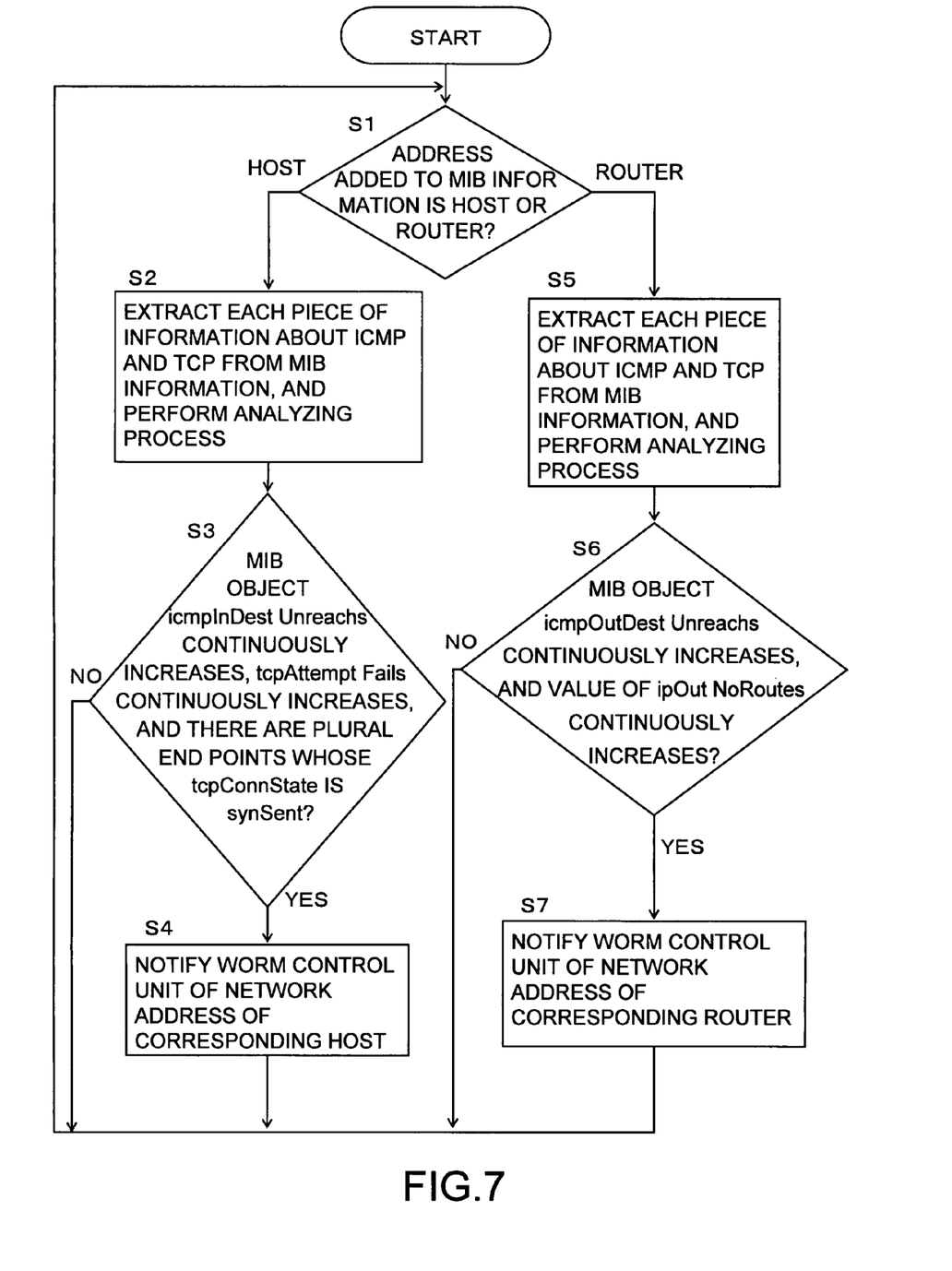
FIG. 7 shows an example of a process flow of the worm detecting process.

FIG. 7 shows a process flow of the worm detecting process. The worm detection unit 11 determines whether or not the address added to the MIB information refers to the router 2 or the host 3 (step S1).

If the address of the MIB information refers to the host 3 (step S1), each information about the ICMP and TCP is extracted, and the analyzing process is performed (step S2). Then, it is determined whether or not the number of unlocated destination messages received (icmpInDestUnreachs) of the ICMP of the MIB object continuously increases, the number of failures in connection establishment trial (tcpAttemptFails) in the corresponding entity continuously increases, and there are plural end points in the connection request transmitting state (synSent) as the TCP connection state (tcpConnState) (step S3). If all conditions are satisfied (step S3), the notification of the network address of the host 3 is transmitted to the worm control unit 12 (step S4).

On the other hand, when the address of the MIB information refers to the router 2 (step S1), the information about the ICMP and the IP is extracted from the MIB information, and the analyzing process is performed (step S5). Then, it is determined whether or not the number of unlocated destination messages received (icmpOutDestUnreachs) of the ICMP of the MIB object continuously increases, and the value of the discard IP datagram (ipOutNoRoutes) by an undetected destination route continuously increases (step S6). If all conditions are satisfied (step S6), the network address of the router 2 is transmitted to the worm control unit 12 (step S7).

Then, the worm control unit 12 perform the worm control process, and instructs the SNMP agent 32 of the host 3 to delete a routing entry on the basis of the address of the host 3 and the apparatus information received from the worm detection unit 11. Also based on the address of the router 2 and the apparatus information received from the worm detection unit 11, the worm control unit 12 sets the SNMP agent 22 of the corresponding router 2 with the filter for cutting off the communications through the activity of a worm.

Figure 8:
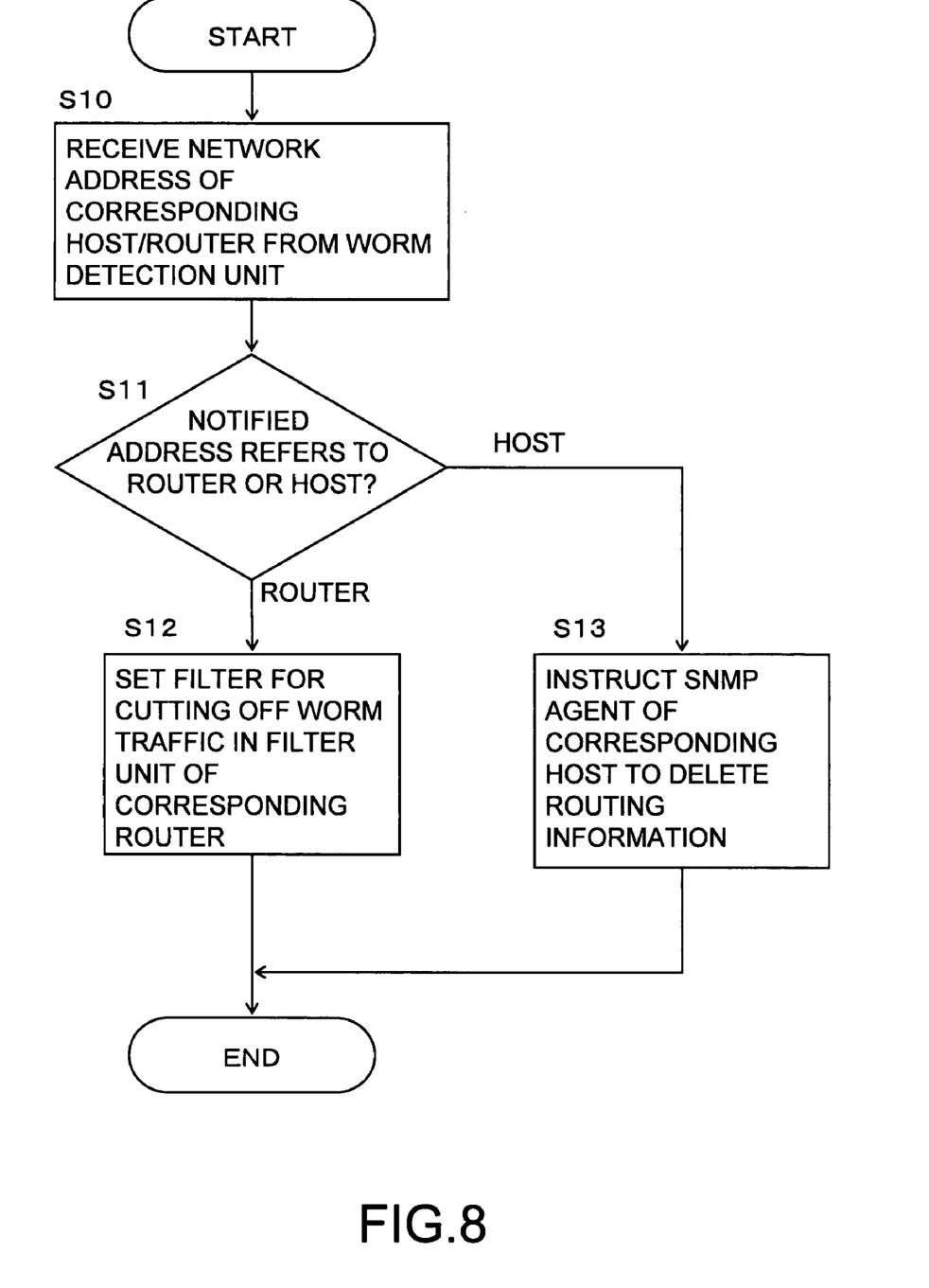
FIG. 8 shows an example of a process flow of the worm control process.

FIG. 8 shows the process flow of the worm control process. Upon receipt of the network address of the corresponding host 3 or router 2 from the worm detection unit 11 (step S10), the worm control unit 12 determines whether or not the received address refers to the router 2 or the host 3 (step S1).

If the notified address refers to the router 2, the setting of a filter for cutting off the traffic of the worm is made on the filtering unit (filter) 21 of the router (step S12). On the other hand, if the notified address refers to the host 3, the SNMP agent 32 of the host 3 is instructed to delete the routing information (step S13).

As described above, the present invention is described by referring to a mode for embodying the present invention and an embodiment, but it is obvious that the present invention can be any of the variations within the gist of the present invention.

For example, the present invention is described as using the SNMP and TCP/IP, but a similar network management facility can also be used. For example, it can be embodied in a packet communication such as the SNA (Systems Network Architecture (IBM)), the FNA (Fujitsu Network Architecture), etc.

Furthermore, the computer 3 is described as embodied by a computer terminal (PC) and a host having a network information management facility, but a mobile terminal, an information domestic appliance, a printer, etc. can be used.

Additionally, although the management information database 14 of the worm monitor apparatus 1 is described as static storage means, but can be data in memory.

Furthermore, the present invention is described as embodied as a program read from a computer and executed, but a program for realizing the present invention can be stored in an appropriate recording medium such as computer-readable portable medium memory, semiconductor memory, a hard disk, etc., can be provided as recorded in these recording media, or provided by communications using a network through a communication interface.

What is claimed is:

1. An unauthorized access program monitoring method for monitoring activity of an unauthorized access program in a network and isolating a detected unauthorized access program, comprising:

obtaining a network management information from a network management information storage unit storing management information about network information collected from a computer or a network connection apparatus;

analyzing the management information about network information collected from a computer or a network connection apparatus, and detecting a change of the management information about the network information specific to the activity of the unauthorized access program;

generating alert information including a type of an apparatus whose management information about network information relating to the detection of the change is collected and address information about an apparatus suspected of performing activities of the unauthorized access program;

analyzing from the alert information the type of an apparatus from which the management information about the network information relating to the detection of the change, and the address information about the computer or the network connection apparatus suspected of performing the activity of the unauthorized access program;

generating an instruction to delete relayed information for a computer designated by the address information when the type of the apparatus is a computer, and generating an instruction to set a filter that cuts off the communication of the unauthorized access program to the network connection apparatus designated by the address information when the type of the apparatus is a network connection apparatus; and transmitting an instruction to delete the relayed information or an instruction to set the filter.

2. An unauthorized access program monitoring method for monitoring activity of an unauthorized access program in a network, comprising:

a management information monitoring step for analyzing management information about network information collected from a computer or a network connection apparatus, and detecting a change of the management information about the network information specific to the activity of the unauthorized access program; and an alert generating step for generating alert information including a type of an apparatus whose management information about network information relating to the detection of the change is collected and address information about an apparatus suspected of performing activities of the unauthorized access program, wherein the management information collected from the computer is analyzed, and one of the values of the number of end points for which a connection is being established in the computer and the number of end points for which a connection fails to be established in the computer indicates the state of a predetermined uptrend is detected as the change of the management information.

3. The unauthorized access program monitoring method according to claim 2, further comprising a management information collecting step for collecting in real time the management information about the network information from the computer or the network connection apparatus.

4. The unauthorized access program monitoring method according to claim 2, wherein in the management information monitoring step, error notification information due to an uncertain destination from the management information collected from the network connection apparatus is extracted, and a state of a predetermined uptrend of the amount of the error notification information during transmission is detected as the change.

5. The unauthorized access program monitoring method according to claim 2, wherein in the management information monitoring step, error notification information due to an uncertain destination from the management information about the network information collected from the computer is extracted, and the state of a predetermined uptrend of the amount of the error notification information during transmission is detected as the change.

6. The unauthorized access program monitoring method according to claim 2, wherein in the management information monitoring step, the amount of information discarded due to an uncertain destination from the management information collected from the network connection apparatus is extracted, and the state of a predetermined uptrend of the amount of discarded information is detected as the change.

7. The unauthorized access program monitoring method according to claim 2, further comprising:

an alert analyzing step for analyzing from the alert information the type of an apparatus from which the management information about the network information relating to the detection of the change, and the address information about the computer or the network connection apparatus suspected of performing the activity of the unauthorized access program;

a control instruction generating step for generating an instruction to delete relayed information for a computer designated by the address information when the type of the apparatus is a computer, and generating an instruction to set a filter that cuts off the communication of the unauthorized access program to the network connection apparatus designated by the address information when the type of the apparatus is a network connection apparatus; and a control directing step for transmitting an instruction to delete the relayed information or an instruction to set the filter.

8. The unauthorized access program monitoring method according to claim 7, further comprising a network configuration managing step for managing the network configuration information showing the configuration of a network, wherein in the control instruction generating unit, the address information about the computer, the network segment, or the network connection apparatus which controls the network segment, which is suspected of performing the activity of the unauthorized access program, is analyzed by referring to the network configuration information.

9. An unauthorized access program detecting apparatus for detecting activity of an unauthorized access program in a network, comprising:

a network management information storage unit for accumulating management information about network information collected from a computer or a network connection apparatus;

a management information monitor unit for analyzing management information about network information collected from a computer or a network connection apparatus, and detecting a change of the management information about the network information specific to the activity of the unauthorized access program; and an alert generation unit for generating alert information including a type of an apparatus whose management information about network information relating to the detection of the change is collected and address information about an apparatus suspected of performing activities of the unauthorized access program, wherein the management information monitor unit analyzes the management information collected from the computer, and detects as the change of the management information one of the values of the number of end points for which a connection is being established in the computer and the number of end points for which a connection fails to be established whichever indicates the state of a predetermined uptrend.

10. The unauthorized access program detecting apparatus according to claim 9, further comprising a management information collection unit for collecting in real time the management information about the network information from the computer or the network connection apparatus.

11. The unauthorized access program detecting apparatus according to claim 9, wherein the management information monitor unit extracts error notification information due to an uncertain destination from the management information collected from the network connection apparatus, and detects as the change a state of a predetermined uptrend of the amount of the error notification information during transmission.

12. The unauthorized access program detecting apparatus according to claim 9, wherein the management information monitor unit extracts the error notification information due to an uncertain destination from the management information about the network information collected from the computer, and detects as the change the state of a predetermined uptrend of the amount of the error notification information during transmission.

13. The unauthorized access program detecting apparatus according to claim 9, wherein the management information monitor unit extracts the amount of information discarded due to an uncertain destination from the management information collected from the network connection apparatus, and detects as the change the state of a predetermined uptrend of the amount of discarded information.

14. An unauthorized access program control apparatus for isolating an unauthorized access program detected in a network, comprising:

an alert analysis unit for receiving alert information including a type of a device suspected of performing activity of the unauthorized access program, and analyzing from the alert information the type of an apparatus from which the management information about the network information relating to the detection of the change, and the address information about the computer or the network connection apparatus suspected of performing the activity of the unauthorized access program;

a control instruction generation unit for generating an instruction to delete relayed information for a computer designated by the address information when the type of the apparatus is a computer, and generating an instruction to set a filter that cuts off the communication of the unauthorized access program to the network connection apparatus designated by the address information when the type of the apparatus is a network connection apparatus; and a control direction unit for transmitting an instruction to delete the relayed information or an instruction to set the filter.

15. The unauthorized access program control apparatus according to claim 14, further comprising:

a network configuration storage unit for storing network configuration information showing a configuration of a network; and a network configuration management unit for managing the network configuration information showing the configuration of a network, wherein the control instruction generation unit analyzes the address information about the computer, the network segment, or the network connection apparatus which controls the network segment, that is suspected of performing the activity of the unauthorized access program, by referring to the network configuration information.

* * * * *

UNITED STATES PATENT AND TRADEMARK OFFICE
CERTIFICATE OF CORRECTION

| | | |
|---|---|---|
| PATENT NO. | : 7,832,010 B2 | Page 1 of 1 |
| APPLICATION NO. | : 11/785558 | |
| DATED | : November 9, 2010 | |
| INVENTOR(S) | : Yoshiki Higashikado et al. | |

It is certified that error appears in the above-identified patent and that said Letters Patent is hereby corrected as shown below:

On the title page, column 1, please insert:

-- (63) Related U.S. Application Data:
Continuation of Application No. PCT/JP2004/015406, filed October 19, 2004 --

Signed and Sealed this
Seventh Day of June, 2011

David J. Kappos
*Director of the United States Patent and Trademark Office*